United States Patent
Ding et al.

(10) Patent No.: US 11,971,476 B2
(45) Date of Patent: Apr. 30, 2024

(54) ULTRASONIC EQUALIZATION AND GAIN CONTROL FOR SMART SPEAKERS

(71) Applicant: Texas Instruments Incorporated, Dallas, TX (US)

(72) Inventors: Lei Ding, Plano, TX (US); Srinath Mathur Ramaswamy, Murphy, TX (US); Brian Burk, Dallas, TX (US); Baher Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/364,011

(22) Filed: Jun. 30, 2021

(65) Prior Publication Data

US 2023/0003880 A1    Jan. 5, 2023

(51) Int. Cl.
*G01S 15/00*    (2020.01)
*G01S 15/04*    (2006.01)

(52) U.S. Cl.
CPC ................... *G01S 15/04* (2013.01)

(58) Field of Classification Search
CPC .......... G01S 15/04; G01S 7/524; G01S 7/527; G01S 15/50; G01S 15/104
See application file for complete search history.

(56) References Cited

U.S. PATENT DOCUMENTS

| | | | | |
|---|---|---|---|---|
| 10,149,958 | B1* | 12/2018 | Tran | G16H 50/20 |
| 10,685,488 | B1* | 6/2020 | Kumar | A61H 23/04 |
| 10,966,056 | B1* | 3/2021 | Amir | G01S 11/16 |
| 11,405,729 | B1* | 8/2022 | French | H04R 3/007 |
| 2007/0024431 | A1* | 2/2007 | Touge | G01S 15/88 340/436 |
| 2014/0321680 | A1* | 10/2014 | Takahashi | H04S 7/302 381/303 |
| 2016/0154089 | A1* | 6/2016 | Altman | G08B 29/26 367/124 |

(Continued)

OTHER PUBLICATIONS

Caicedo et al., "Ultrasonic Array Sensor for Indoor Presence Detection," 20th European Signal Processing Conf. (EURASIP 2012), pp. 175-179.

(Continued)

*Primary Examiner* — Fekadeselassie Girma
(74) *Attorney, Agent, or Firm* — Frank D. Cimino

(57) ABSTRACT

Ultrasonic audio processing circuitry and a method useful in ultrasonic presence detection. An ultrasonic burst generator produces an ultrasonic burst signal at one or more ultrasonic frequencies, and an equalizer equalizes that ultrasonic burst signal according to frequency response characteristics of the speaker and microphone at those ultrasonic frequencies. Driver circuitry drives a speaker with the ultrasonic burst signal, which may be combined with an audible audio signal. An ultrasonic separation filter separates an ultrasonic portion from a signal received at a microphone, and processing circuitry is provided to determine a delay time of an echo corresponding to the ultrasonic burst signal in that separated ultrasonic portion of the received signal. In another aspect, the equalizer equalizes an ultrasonic portion of the signal received at a microphone, according to frequency response characteristics of the speaker and microphone at the ultrasonic frequencies of the burst.

22 Claims, 9 Drawing Sheets

(56) References Cited

U.S. PATENT DOCUMENTS

| | | | |
|---|---|---|---|
| 2016/0309246 A1* | 10/2016 | O'Keeffe | H04W 4/70 |
| 2017/0248696 A1* | 8/2017 | Vyssotski | G01S 5/30 |
| 2017/0323481 A1* | 11/2017 | Tran | H04N 23/611 |
| 2018/0326945 A1* | 11/2018 | Hwang | G01S 13/56 |
| 2019/0089550 A1* | 3/2019 | Rexach | E03C 1/057 |
| 2019/0090056 A1* | 3/2019 | Rexach | G01N 33/1826 |
| 2020/0042285 A1* | 2/2020 | Choi | H03G 5/165 |
| 2021/0089263 A1* | 3/2021 | Milne | G06F 3/165 |
| 2021/0208664 A1* | 7/2021 | Thomas | G06F 1/1616 |
| 2022/0049983 A1* | 2/2022 | Grunwald | G01F 1/667 |

OTHER PUBLICATIONS

Pandharipande et al., "User localization using ultrasonic presence sensing systems," Int'l Conf on Systems, Man, and Cybernetics (IEEE, 2012), pp. 3191-3196.

Naghibzadeh et al., "Indoor Granular Presence Sensing with an Ultrasonic Circular Array Sensor," Int'l Symp. on Intelligent Control (IEEE 2014), p. 1644-49.

Getreuer et al., "Ultrasonic Communication Using Consumer Hardware," Trans. on Multimedia, vol. 20, No. 6 (IEEE, 2018), pp. 1277-1290.

Lilly, "Google Updates Nest Hub, Nest Hub Max With Ultrasound User Presence Detection," Hot Hardware (Nov. 6, 2019).

Udall, "How ultrasound sensing makes Nest displays more accessible," Google The Keyword blog (Dec. 4, 2019), https://blog.google/products/google-nest/ultrasound-sensing/.

"Occupancy Sensor Technologies: Microphonics vs. Ultrasonic" (Acuity Controls, 2016).

Schnoor, "Presence Detection with TAS5825M using Ultrasound," Application Report SLAA539 (Texas Instruments Incorporated, Sep. 2020).

"TAS5805M 23-W, Inductor-Less Digital Input, Stereo, Closed-Loop Class-D Audio Amplifier with Enhanced Processing and Low Power Dissipation," Datasheet SLASEH5D (Texas Instruments Incorporated, Nov. 2020).

"TAS5825M 4.5 V to 26.4V, 38-W Stereo, Inductor-Less, Digital Input, Closed-Loop Class-D Audio Amplifier with 192-kHz Extended Audio Processing," Datasheet SLASEH7G (Texas Instruments Incorporated, Jul. 2020).

* cited by examiner

ULTRASONIC EQUALIZATION AND GAIN CONTROL FOR SMART SPEAKERS

BACKGROUND

This relates to presence and motion detection, and is more specifically directed to ultrasonic presence and motion detection.

Various technologies have been used to detect the presence and motion of objects, including human occupants of a room or other space. These technologies include those relying on two-way radio communication, such as those using radio frequency (RF) radar techniques, RF identification (RFID) tags or mobile devices, camera sensors, and infrared detection.

Ultrasonic acoustic sensing and detection has recently been applied to user presence detection, for example as implemented in occupancy-adaptive lighting systems. Examples of such ultrasonic presence detection systems include a broad-beam ultrasonic transmitter transmitting bursts of sinusoidal pulses and an array of receivers that detect reflections of those bursts from objects in the vicinity of the transmitter. Distance, direction, and motion of the objects in the room are derivable from the ultrasonic echoes at the various receivers in the array.

Ultrasonic proximity sensing has now been implemented in the NEST HUB line of "smart" speakers available from Google. These speakers are "smart" in the sense that built-in microphones receive voice commands from the user for controlling lighting, audio, security, heating and cooling, and other "smart home" functions. The ultrasonic sensing feature in these smart speakers operates by emitting ultrasonic acoustic waves from the speakers, and sensing reflections via the built-in microphones to detect the presence of a user. This user proximity is used to enable additional interaction between the user and the device, for example by changing the contents of a video display.

The use of ultrasonic acoustic signals as a communication technology, for example between intelligent devices in proximity with one another, has also been proposed. For example, such ultrasonic communication can be used for identification and authentication of a user device that is in proximity of audio/video display systems, lighting systems, or smart home devices.

BRIEF SUMMARY

According to one aspect, a method for performing ultrasonic detection by emitting an ultrasonic burst from a speaker and detecting an echo at a microphone is provided. The method includes the generation of an ultrasonic burst signal at one or more ultrasonic frequencies followed by the equalization of that ultrasonic burst signal according to frequency response characteristics of the speaker and microphone at those ultrasonic frequencies, and driving of the speaker with the equalized ultrasonic burst. A delay time of an echo corresponding to the ultrasonic burst signal in an ultrasonic portion of a signal received from a microphone is then determined.

According to another aspect, a method for performing ultrasonic detection by emitting an ultrasonic burst from a speaker and detecting an echo at a microphone is provided. The method includes the generation of an ultrasonic burst signal at one or more ultrasonic frequencies and driving a speaker with the ultrasonic burst signal. An ultrasonic portion of a signal received at a microphone is then separated, and this separated ultrasonic portion is equalized according to frequency response characteristics of the speaker and microphone at those ultrasonic frequencies. A delay time of an echo corresponding to the ultrasonic burst signal in the equalized ultrasonic portion of that received signal is then determined.

According to another aspect, audio processing circuitry is provided that includes an ultrasonic burst generator that produces an ultrasonic burst signal at one or more ultrasonic frequencies, and an equalizer that equalizes that ultrasonic burst signal according to frequency response characteristics of the speaker and microphone at those ultrasonic frequencies. Driver circuitry drives a speaker with the ultrasonic burst signal. An ultrasonic separation filter separates an ultrasonic portion from a signal received at a microphone, and processing circuitry is provided to determine a delay time of an echo corresponding to the ultrasonic burst signal in that separated ultrasonic portion of the received signal.

According to another aspect, audio processing circuitry is provided that includes an ultrasonic burst generator that produces an ultrasonic burst signal at one or more ultrasonic frequencies. Driver circuitry drives a speaker with the ultrasonic burst signal. An ultrasonic separation filter separates an ultrasonic portion from a signal received at a microphone, and an equalizer equalizes that ultrasonic portion according to frequency response characteristics of the speaker and microphone at those ultrasonic frequencies. Processing circuitry is provided to determine a delay time of an echo corresponding to the ultrasonic burst signal in that equalized ultrasonic portion of the received signal.

Technical advantages enabled by one or more of these aspects include improved spatial resolution in presence detection and other operations based on received ultrasonic echoes, and in efficient hardware and computational realization of the ultrasonic processing system.

BRIEF DESCRIPTION OF THE SEVERAL VIEWS OF THE DRAWING

The same reference numbers are used in the drawings to illustrate the same or similar (by function and/or structure) features.

DETAILED DESCRIPTION

The one or more embodiments described in this specification are implemented into home audio and video systems, as it is contemplated that such implementation is particularly advantageous in that context. However, it is contemplated that aspects of these embodiments may be beneficially applied in other applications, for example in industrial, commercial, and environmental systems and settings.

Figure 1:
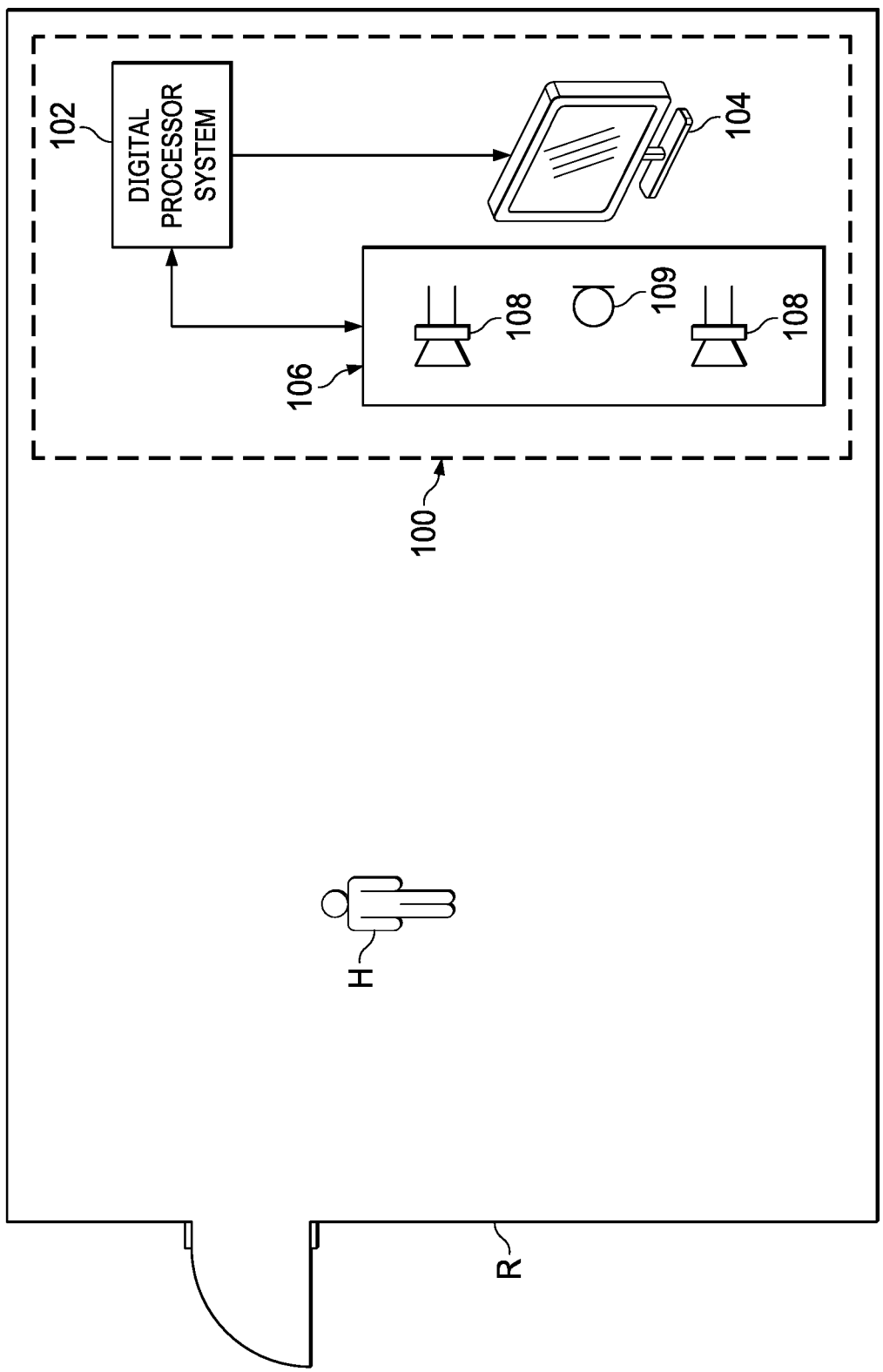
FIG. 1 is a plan view of a room in which an audio/video system, shown in the form of a block diagram, in which one or more of the described embodiments may be implemented.

FIG. 1 illustrates an example of an audio/video environment in which the described embodiments may be implemented. In this example, audio/video system 100 is deployed in a room R, and is constructed to include digital processor system 102 coupled to display 104 and audio system 106 by way of a wired or wireless connection. Digital processor system 102 provides some level of computing capacity to audio/video system 100 such as control of content presented at display 104 and audio system 106, and for purposes of this description, the generation and processing of ultrasonic signals via audio system 106 for presence or motion detection, such as the detection of the presence or movement of one or more humans H within room R. The generation and processing of ultrasonic signals via audio system 106 according to these implementations may additionally or alternatively be used in applications such as gesture recognition and short distance user interface technologies as finger or hand tracking.

The physical realization of audio/video system 100 can vary widely. For example, digital processor system 102 may be realized within the same physical enclosure as display 104, for example in a so-called "smart" television, or alternatively may be a digital receiver, set top box, computer, or other such device that is physically separate from display 104 and coupled to display 104 by an appropriate external wired or wireless connection. Audio system 106 in this example includes one or more speakers 108 and one or more microphones 109. Audio system 106 may similarly be realized within the same physical enclosure as display 104 (along with or separate from digital processor system 102). Speakers 108 and microphone 109 may be contained within the same physical enclosure, such as in a "sound bar,", or alternatively may be physically distributed around room R by way of multiple speakers (e.g., as "5.1 surround sound" and the like). Furthermore, microphone 109 may be realized within the same enclosure as display 104 but separate from speakers 108. As such, FIG. 1 illustrates audio/video system 100 arranged logically, rather than strictly in a physical arrangement.

According to the implementations described in this specification, audio/video system 100 is constructed and adapted to use ultrasonic acoustic energy to perform one or more operational functions. One such function is presence detection, carried out by digital processor system 102 causing one or more of speakers 108 to emit ultrasonic sound in the form of a burst of sinusoidal pulses, such as a "chirp" over varying frequency, and detecting the arrival of echoes or reflections of that ultrasonic chirp from the environment of room R, including objects in room R such as human H. Such user presence detection can be used by digital processor system 102 itself, or through other devices in the home or building, to play a program from display 104 and audio system 106 when human H enters room R and pause the program when human H leaves room R. User presence can also be used for other functions, such as security functions (e.g., intruder detection).

Examples of other operational functions that may be carried out through ultrasonic detection by audio/video system 100 in the arrangement of FIG. 1 include gesture detection, by way of which human H can control the operation of audio/video system 100. Ultrasonic detection can also be used by audio/video system 100 in directivity control of its audible audio output, for example by "beam-forming" or otherwise adjusting output from speakers 108 to optimize the audio experience according to the shape and contents of room R, the number and locations of humans H within room R, and the like. Ultrasonic communication may be implemented by audio/video system 100, for example in the identification and authentication of users in room R by communication between user handheld devices and audio system 106 via ultrasonic signals. For purposes of this description, the term "presence detection" is considered to encompass these and other similar operational functions enabled by audio/video system 100 according to the implementations described in this specification.

Furthermore, while audio/video system 100 is illustrated in FIG. 1 as including display 104, it is further contemplated that the ultrasonic operation described in these implementations may be realized by audio-only systems, such as smart speaker systems.

Figure 2:
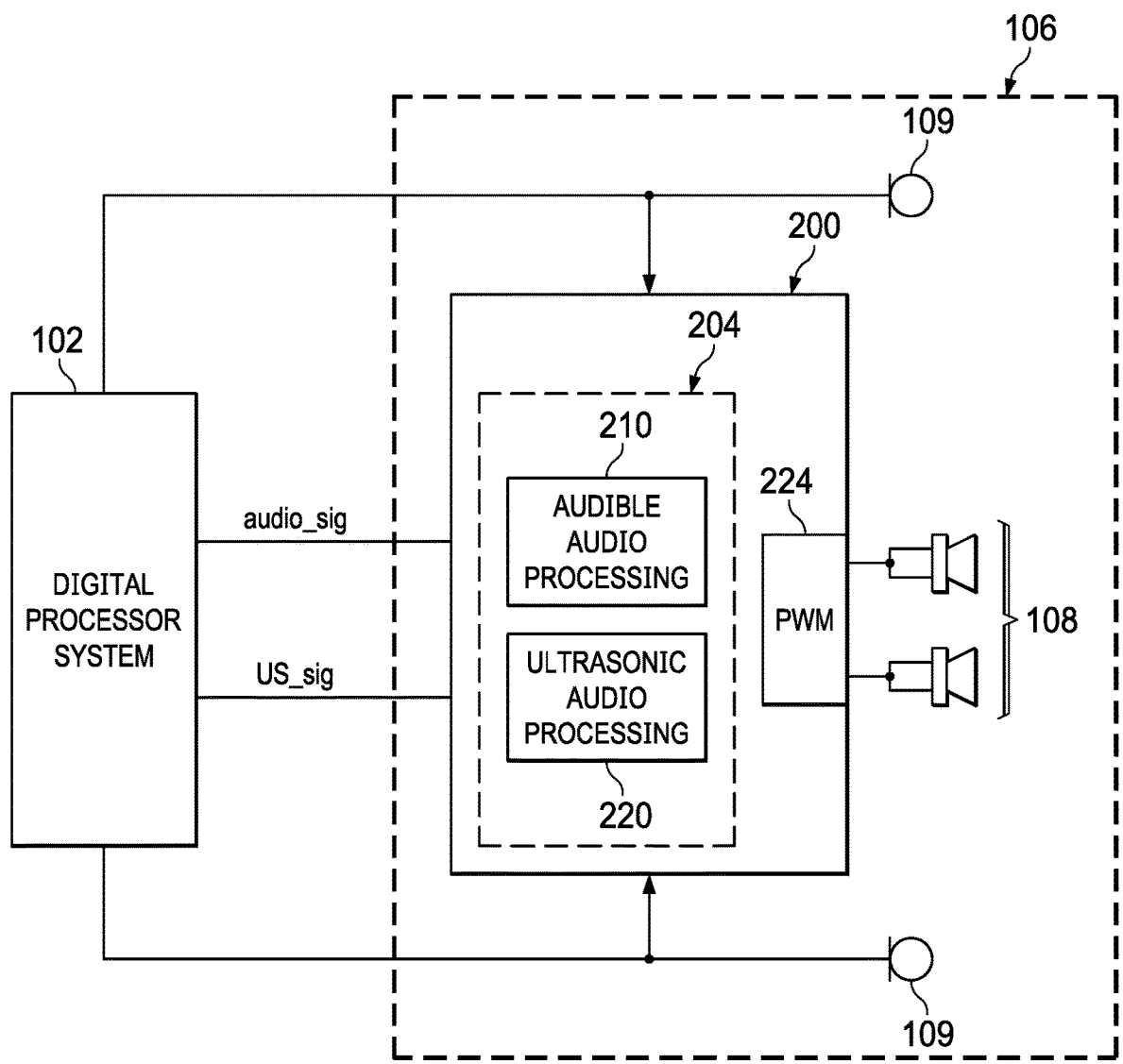
FIG. 2 is an electrical diagram, in block and schematic form, of an audio/video system such as shown in FIG. 1 and in which one or more of the described embodiments may be implemented.

FIG. 2 is a block diagram illustrating the architecture of audio system 106 and its cooperation with digital processor system 102 according to an example implementation. As described above relative to FIG. 1, audio system 106 in this example includes two speakers 108, two microphones 109, and digital audio amplifier 200. More or fewer speakers or microphones may be implemented in or with audio system 106, as desired for particular implementations.

Digital audio amplifier 200 in this implementation may be realized as a closed-loop Class-D multiple channel audio amplifier that includes, in the same integrated circuit, an integrated audio processor 204. For example, audio processor 204 may be a programmable digital signal processor capable of supporting multiple channel and frequency band operation, and advanced functions and features as desired; memory (not shown) may be provided within or in combination with audio processor 204 for storage of program instructions executable by digital logic and processing units in audio processor 204. In this example, as illustrated in FIG. 2, audio processor 204 includes audible audio processing function 210 for the processing of data into signals for generating signals at human-audible frequencies, and ultrasonic audio processing function 220 for generating and receiving signals at ultrasonic frequencies, at upper frequencies within and beyond those generally audible by humans. Digital audio amplifier 200 in this example is a Class-D amplifier, and as such includes pulse-width-modulation circuitry 224, including such circuitry as digital-to-PWM conversion, H bridge and gate driver circuitry, and the like. Other support circuitry may be included in digital audio amplifier 200 according to this implementation, for example the appropriate clock circuitry (e.g., phase-locked loop circuitry, low dropout oscillators (LDO)), modulator and demodulator circuitry, and various input/output circuitry for communicating with digital processor system 102 to carry out the functions described below and other functions useful to the overall system.

Examples of audio amplifiers suitable for implementing digital audio amplifier 200 according to this implementation include the TAS5805M and TAS5825M families of digital audio amplifiers available from Texas Instruments Incorporated, such audio amplifiers constructed, programmed, or otherwise configured or adapted to perform the functions and operations described in this specification.

As shown in FIG. 2, digital audio amplifier 200 is coupled to digital processor system 102 to receive digital signals according to which speakers 108 are to be driven. These digital signals include signals audio_sig corresponding to digital data representing the audio output at human-audible frequencies, and signals US_sig corresponding to digital data representing the audio output at ultrasonic frequencies. For purposes of this description, ultrasonic frequencies are considered as those frequencies sufficiently high in frequency as to be generally inaudible by most humans. For example, frequencies of at least 18 kHz are commonly considered as ultrasonic frequencies. In one example, signals US_sig from digital processor system 102 may correspond to the ultrasonic burst itself (e.g., as a sample stream at the ultrasonic frequency. Alternatively, in another example, signals US_sig from digital processor system 102 may include data representing parameters of the ultrasonic burst, such parameters including frequency, burst duration, trigger burst, and the like; in this alternative example, digital audio amplifier 200 operates to generate the ultrasonic burst according to the parameters communicated by signals US_sig. In any event, the data represented by signals US_sig in this implementation are not considered to bear information that is to be perceived by humans in audible range of speakers 108, but rather is intended for use in presence detection as described herein.

Microphones 109 are coupled to digital audio amplifier 200 and digital processor system 102 according to the implementation of FIG. 2. As will be described in further detail below, microphones 109 are provided to capture ultrasonic acoustic signals, including reflections or echoes of ultrasonic acoustic waves emitted by speakers 108 under the control of digital audio amplifier 200. Microphones 109 may also be constructed to capture audible frequencies, such as may be useful to receive voice commands from a human user in a "smart" speaker implementation. As such, microphones 109 transduce the received acoustic energy to electrical signals that are forwarded to either or both of digital audio amplifier 200 and digital processor system 102 in this implementation.

As mentioned above, many modern audio/video systems are implemented as a combination of various components, primarily as selected by the end user of the system. For example, a smart television set may serve as display 104 in the reference arrangement of FIG. 1, while a separate audio system 106 with speakers 108 and perhaps microphone 109 is provided for audio input and output. In some cases, microphone 109 may be implemented within display 104, or alternatively in a remote control device that communicates with a streaming device plugged into a port of display 104. In any case, a wide variety of speakers 108, microphones 109, and displays 104 may be combined into audio/video system 100. Digital processor system 102, whether implemented as a stand-alone function or within the same physical enclosure as either display 104 or audio system 106, can thus be called upon to operate and control these various selected devices.

Figure 3A:
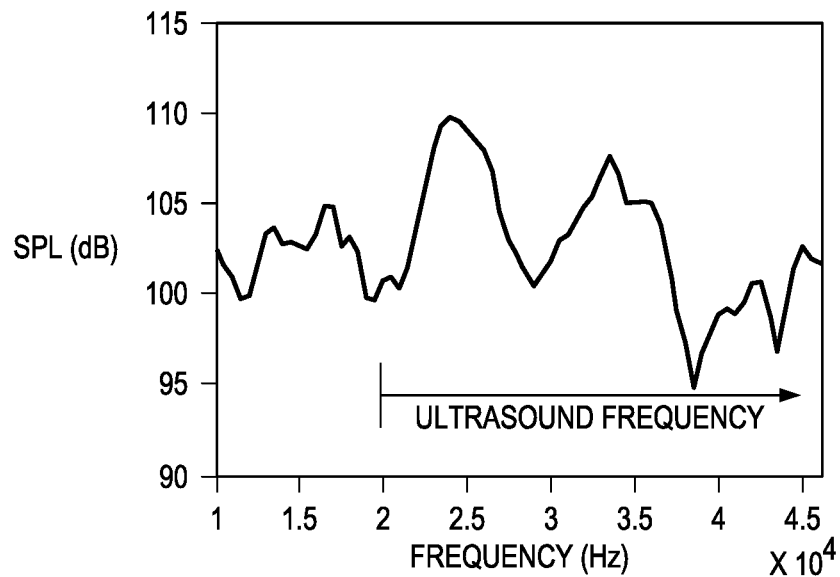
FIG. 3A is a plot of the ultrasonic frequency response of a conventional speaker.
Figure 3B:
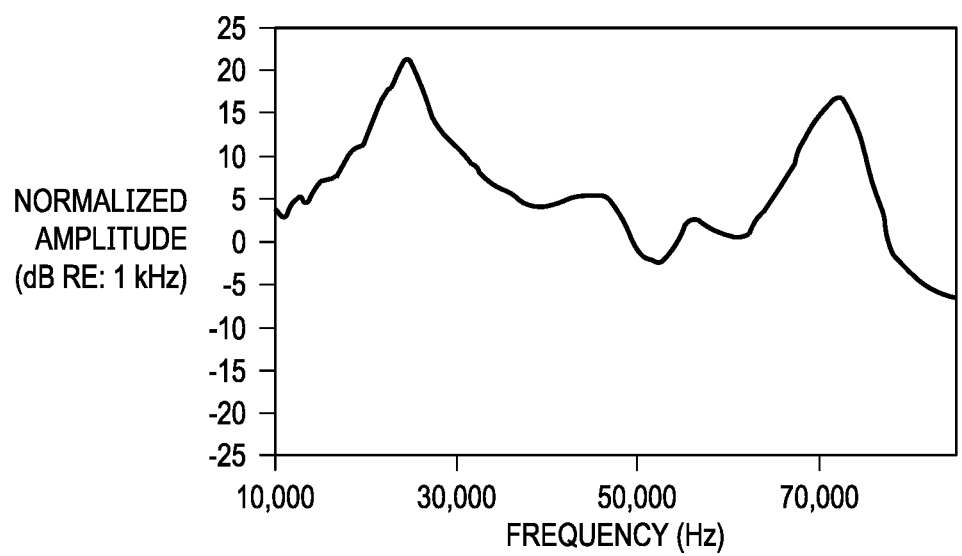
FIG. 3B is a plot of the ultrasonic frequency response of a conventional microphone.

It has been observed, according to these embodiments, that the wide variety of speakers 108 and microphone 109 that may be used in audio/video system 100 presents challenges to the implementation of ultrasonic presence detection. Specifically, the frequency response of speakers and microphones can vary widely among various models and types, especially for ultrasonic frequencies as many speakers and microphones are primarily designed and optimized for audible frequencies. FIG. 3A illustrates an example of the frequency response, expressed as sound pressure level (SPL), of a conventional loudspeaker over frequencies ranging from over frequencies ranging from high audible frequencies (e.g., above 10 kHz) well into the ultrasonic range (e.g., up to 45 kHz). As evident from this plot, the output of this speaker varies by as much as 15 dB within the ultrasonic range. FIG. 3B similarly illustrates an example of the frequency response of a conventional microphone, expressed as a normalized amplitude relative to amplitude at 1 kHz) over frequencies ranging from 10 kHz to beyond 70 kHz, and also shows amplitude variations of as much as 15 dB over ultrasonic frequencies up to around 40 kHz, but with a different frequency dependence (e.g., a single peak at about 25 kHz) from that of the speaker plot of FIG. 3A (e.g., two peaks between 20 kHz and 40 kHz). Furthermore, while these frequency response characteristics may be typical for speakers and microphones of those particular models, the response characteristics of both loudspeakers and microphones varies among model and type.

Referring back to FIG. 1, these non-ideal and widely varying frequency response characteristics of speakers 108 and microphones 109 complicate the ability of digital processor system 102 to execute ultrasonic presence detection in heterogeneous systems such as audio/video system 100. As mentioned above relative to FIG. 1, detection of an object using acoustic energy can be performed by stimulating speakers 108 to emit ultrasonic sound in the form of a burst of sinusoidal pulses, such as a "chirp" over varying ultrasonic frequencies, and detecting the time at which echoes or reflections of that ultrasonic burst are sensed by microphone 109, for example by time-domain correlation of a chirp output from speakers 108 with the signal received from microphone 109 to determine the delay time at maximum correlation. It has been observed, in connection with these embodiments, that the non-ideal frequency response characteristics of speakers 108 and microphones 109 can hamper the resolution of this correlation.

Figure 3C:
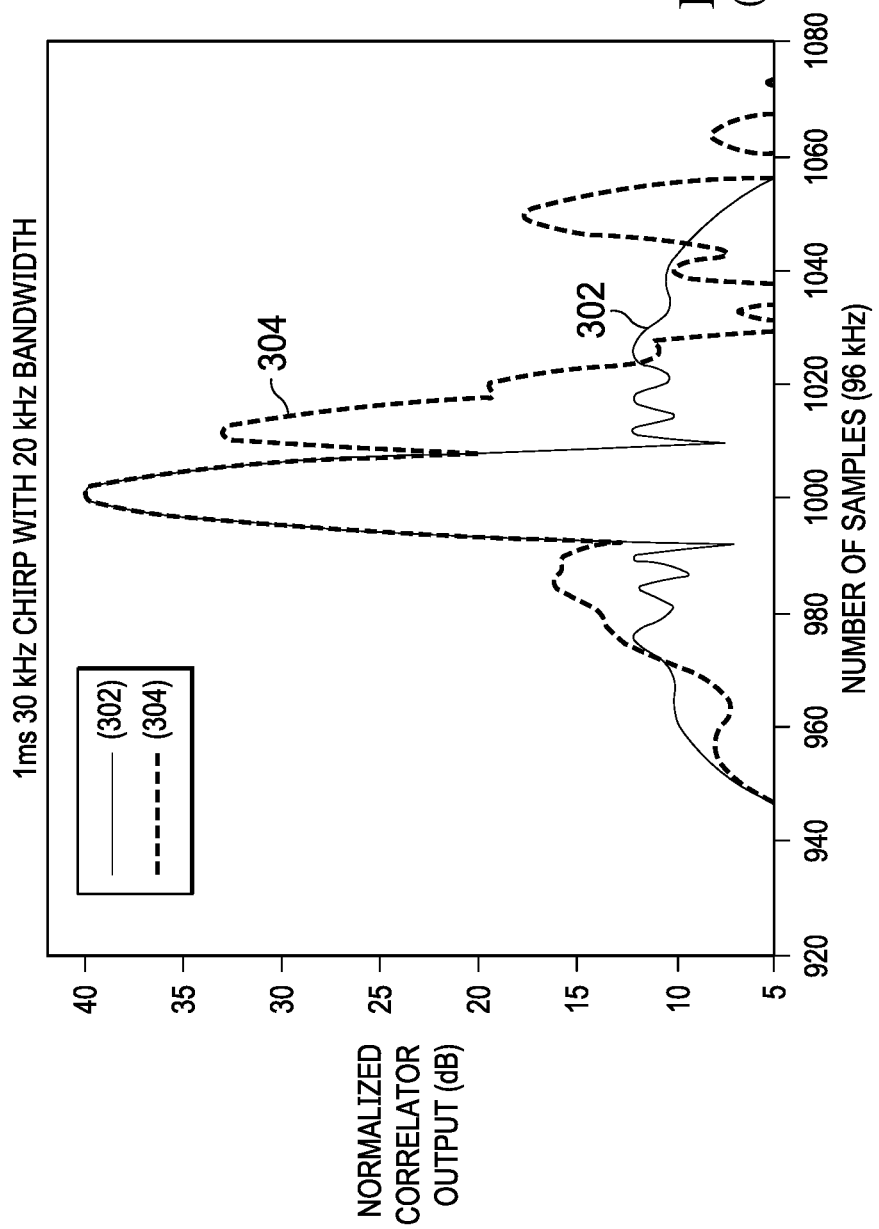
FIG. 3C illustrates a plot of time-domain correlation of an ultrasonic chirp from the conventional speaker of FIG. 3A as received by the conventional microphone of FIG. 3B, relative to a plot of time-domain correlation for the chirp over an ideal channel.

FIG. 3C plots the normalized output of time-domain correlation (in dB) of a 1 msec ultrasonic "chirp" of 20 kHz bandwidth centered at 30 kHz (i.e., the chirp varies in frequency from 20 kHz to 40 kHz), as expressed in numbers of samples at a 96 kHz sampling rate. Plot 302 in FIG. 3C illustrates the correlation for a theoretical speaker and microphone that both have ideal frequency response characteristics (i.e., flat over 20 kHz to 40 kHz). This ideal plot 302 has a clearly identifiable correlation peak at about 1000 samples, with sidelobes with amplitudes at least 25 dB lower amplitude from the correlation peak. In contrast, plot 304 illustrates the correlation for the same 1 msec chirp output by speaker 108 with a frequency response as shown in FIG. 3A, with the echo detected by microphone 108 with a frequency response as shown in FIG. 3B. As evident from plot 304, while the correlation peak is still evident at about 1000 samples, significant sidelobes are present on either side of this correlation peak, particularly for the sidelobe immediately after the correlation peak, which is less than 10 dB lower than the correlation peak. This non-ideal speaker and microphone frequency response effectively widens the detected echo, which greatly limits the spatial resolution at which ultrasonic detection may be performed.

Figure 4:
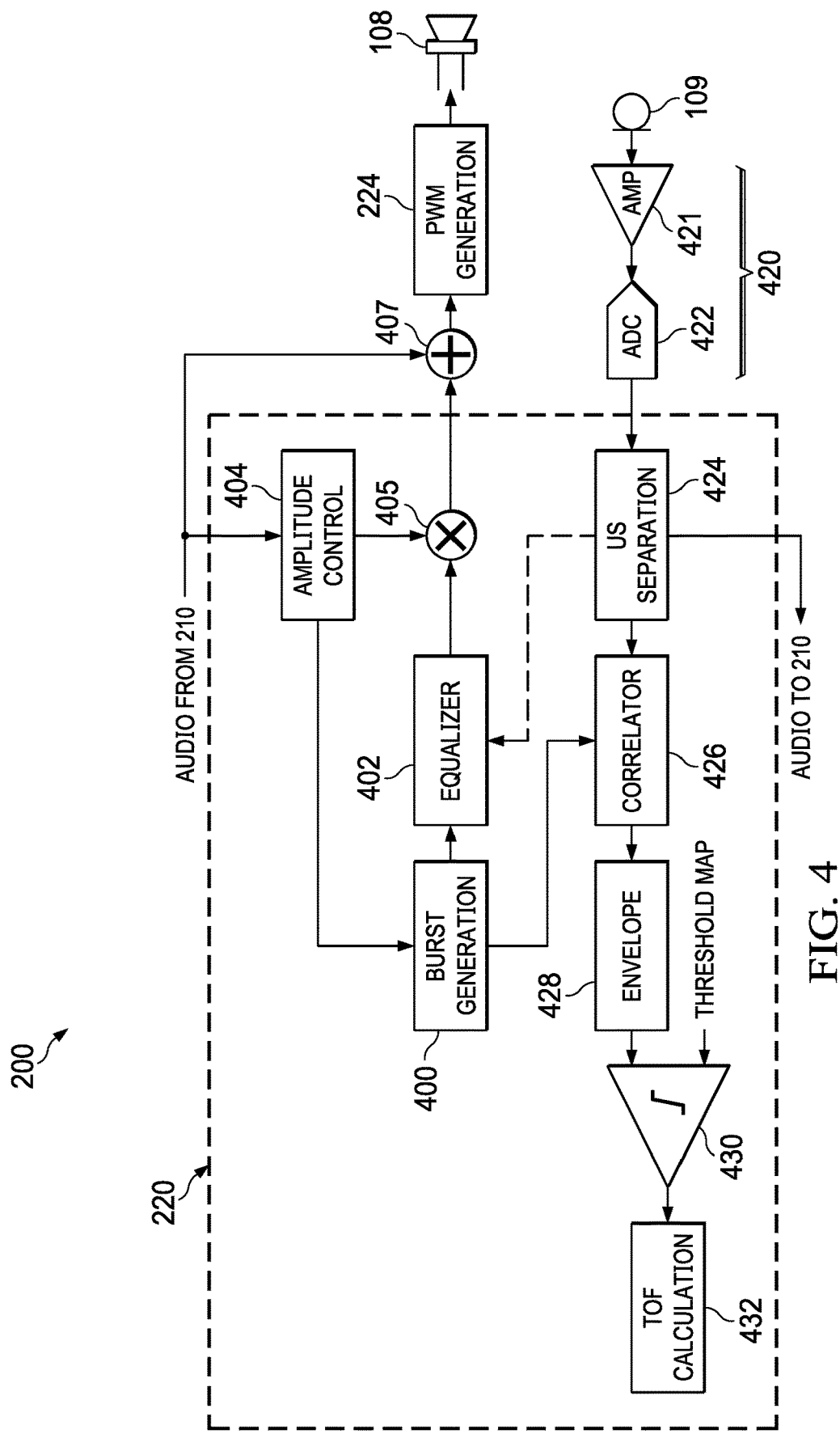
FIG. 4 is an electrical diagram, in block and schematic form, of an ultrasonic processing function in a digital audio amplifier according to an example embodiment.

FIG. 4 illustrates the construction and functional arrangement of a portion of digital audio amplifier 200 in audio system 106 including ultrasonic audio processing function 220, according to an example embodiment. Other circuitry and functions, for example digital filters and other circuitry for processing audible audio signals, may also be provided within digital audio amplifier 200. While this description may indicate that certain functions in FIG. 4 are realized within digital audio amplifier 200 in the architecture of FIG. 2, it is contemplated that some or all of these functions may alternatively be realized in digital processor system 102, depending on the application or system implementation. It is also contemplated that some of the functions shown in FIG. 4 may be implemented using programmable logic circuitry in audio processor 204, such as a digital signal processor, in which case memory that stores executable program instructions for carrying out these functions and operations will also be provided in audio processor 204 or elsewhere in digital audio amplifier 200 or another appropriate device. Alternatively, some or all of these functions may be realized in custom or semi-custom logic circuitry, as desired for the particular implementation.

Referring to FIG. 4, burst generation function 400 is provided in ultrasonic audio processing function 220 to generate an ultrasonic burst or "chirp" signal at its output for use in in ultrasonic presence detection according to this implementation. In one example, burst generation function 400 may generate a "chirp" in the form of a short series or burst of sinusoidal pulses at varying ultrasonic frequencies; this variation in frequency over the chirp can facilitate detection and correlation of a received echo signal with the transmitted signal. In this chirp approach, the frequency may vary linearly, nonlinearly, or according to a frequency or phase modulation such as an orthogonal frequency division multiplexing (OFDM), binary frequency shift keyed (BFSK) scheme, binary phase shift keyed (BPSK) scheme, or the like. Alternatively, burst generation function 400 may instead generate a burst of sinusoidal pulses at a constant ultrasonic frequency at its output. For purposes of this description, the term "burst" is intended to refer to any of these and similar examples of the ultrasonic signal generated by burst generation function 400, including those at a single frequency or at varying frequencies.

Additional control logic (not shown) may be provided in digital audio amplifier 200 for controlling the time at which burst generation function 400 issues the burst signal. For example, the presence detection operation may be performed continuously or periodically. Alternatively, burst generation function 400 may be controlled to issue the burst in response to an event or condition, such as in response to the audible audio content being at a low amplitude. The burst signal issued by burst generation function 400 may be in the form of an analog signal in the time domain, or a discrete time sample stream. In any of these forms, the burst generated by burst generation function 400 is applied to discrete time equalizer 402.

Equalizer 402 in this example implementation is implemented in digital audio amplifier 200 to pre-compensate the burst signal for the non-ideal frequency response characteristics of both speaker 108 and microphone 109 over the frequencies of interest. Equalizer 402 may be realized by way of a discrete-time equalizer, such as a continuous-time discrete-time linear equalizer, for the case in which burst generation function 400 generates the burst as a discrete-time sample stream, as in this architecture in which ultrasonic audio processing function 220 is realized by digital signal processor in audio processor 204. Alternatively, if burst generation function 400 generates the burst as an analog signal, equalizer 402 may be realized by way of a continuous-time equalizer, or as a continuous-time equalizer in combination with a discrete-time equalizer, as desired. In this implementation, equalizer 402 is a bandlimited equalizer in that it is arranged to operate on signal frequencies within a relatively narrow band of interest, namely ultrasonic frequencies including those of the burst signal. Accordingly, equalizer 402 can be efficiently realized from a hardware standpoint as compared with equalizers covering a full frequency range including both audible and ultrasonic frequencies. The construction and adaptation of equalizer 402 according to example implementations will be described in further detail below.

Equalizer 402 produces at its output an equalized signal, for example an equalized discrete-time sample stream, which is applied to gain stage 405. Gain stage 405 applies, to this equalized ultrasonic signal from equalizer 402, a gain that is selected or otherwise controlled by amplitude control function 404. In this example implementation, amplitude control function 404 operates to adjust the gain applied by gain stage 405, and thus adjust the amplitude of the equalized ultrasonic signal, according to the amplitude level of the audible audio signal received from audible audio processing function 210. For example, amplitude control function 404 may control gain stage 405 to reduce the amplitude of the equalized ultrasonic signal during those times in which the amplitude of the audible audio signal is at a high level, such as above a threshold level or according to a linear or other function. Alternatively or in addition, amplitude control function 404 may control burst generation function 400 to block the ultrasonic signal entirely (as suggested in FIG. 4) if the amplitude of the audible audio signal is above a threshold level. This gain control serves to avoid clipping in the driving of speakers 108. Alternatively, amplitude control function 404 may receive a different or additional control signal, for example from digital processor system 102, in order to control the gain applied by gain stage 405 for other reasons. For example, amplitude control function 404 may be controlled by digital processor system 102 to ramp up and ramp down the amplitude of the equalized ultrasonic signal to avoid audible artifacts, or to adjust the amplitude of the equalized ultrasonic signal according to the desired detection distance (e.g., at 1 meter vs. 5 meters from speaker 108) and thus reduce power consumption when sensing at shorter distances. Further in the alternative, amplitude control function 404 may be omitted in some implementations.

The output of gain stage 405 is coupled to one input of signal adder 407, which produces a signal corresponding to the sum of the amplified ultrasonic signal from gain stage 405 with an audio signal representative of audible audio content from audible audio processing function 210. Audible audio processing function 210 may itself include an equalizer function as common in modern audio systems, by way of which the amplitude of the audio output over frequency can be adjusted according to the user's taste for the type of audio content being played, in which case the audio signal from audible audio processing function 210 as applied to signal adder 407 will itself have been equalized accordingly. Signal adder 407 overlays the audible audio to be output by audio system 106 with the ultrasonic burst produced by burst generation function 400 for purposes of ultrasonic presence detection. For the example in which both the audio signal from audible audio processing function 210 and the ultrasonic burst are discrete-time sample streams, either as generated by burst generation function 400 or by equalizer 402, the summing performed by signal adder 407 may be realized by simply summing the samples at each sample period, with interpolation or other processing applied as necessary if the sampling rates differ.

The summed audio signals from signal adder 407 are applied to PWM generation circuitry 224. In this example, PWM generation circuitry 224 may be a speaker driver circuit that generates the appropriate pulse-width-modulated Class-D output signals to drive speaker 108 to produce audible and ultrasonic sound according to the summed audio signals from signal adder 407. If multiple speakers 108 are present in audio system 106, the speakers 108 may be driven simultaneously, typically with different drive signals for the audible content to attain a stereo or surround effect. The drive signals for the ultrasonic frequencies may be simultaneously driven at all speakers 108, or alternatively speakers 108 may be driven with the ultrasonic signals at different times (perhaps as different chirps) to facilitate triangulation or other 2D or 3D locating as part of the ultrasonic presence detection operation.

On the receive side of the implementation of FIG. 4, signals received from microphone 109 are received at an input of interface 420, which in this example includes and other typical filtering and amplification circuitry (not shown) as generally provided in microphone and other audio interfaces. In this example, interface 420 includes low noise amplifier (LNA) 421, which amplifies the received microphone signals and applies the amplified signal to analog-to-digital converter (ADC) 422 for conversion from analog to digital, for example a discrete-time sample stream corresponding to audio received at microphone 109. This discrete-time sample stream from ADC 422 is applied to upstream separation function 424 in ultrasonic audio processing function 220, for filtering by one or more discrete-time or digital filters, to separate the portion of the received signal at ultrasonic frequencies from the portion of the received signal at other frequencies, including audible frequencies. Separation of the ultrasonic signal by ultrasonic signal separation function 424 may of course be performed by way of a high-pass digital filter, for example realized by a digital filter function executed by digital signal processor in audio processor 204. In some embodiments, audio received by microphone 109 at audible frequencies may not be of interest, in which case ultrasonic signal separation function 424 may include only a high-pass filter. Alternatively, if the received audio at audible frequencies is of interest (e.g., if audio system 106 is capable of receiving voice commands), the portion of the received signal at audible frequencies may be itself filtered from the audio signal as received, and then forwarded by ultrasonic signal separation function 424 to audible audio processing function 210 as indicated in FIG. 4.

The ultrasonic portion of the received audio signal is forwarded by ultrasonic signal separation function 424 to correlator 426, which also receives a template of the ultrasonic burst as generated by burst generation function 400. This template of the generated burst may be a copy of the burst as generated, or alternatively may be a stored representation of the burst. A timestamp or other time base indication of the time at which the ultrasonic burst is generated by burst generation function 400, and for the time of receipt of the ultrasonic signal, are preserved to enable determination of a delay time between the two signals.

Correlator 426 operates to correlate the received ultrasonic signal with the ultrasonic burst to determine the time-of-flight, or two-way travel time, of the ultrasonic burst from speaker 108 to a reflecting object and back to microphone 109. For example, this correlation may be performed in the time domain to produce a discrete-time correlation signal over time.

Alternatively, for the case in which the ultrasonic burst signal generated by burst generation function 400 and output at speaker 108 is a single ultrasonic tone, a band-pass discrete-time filter could serve to perform both of the functions of ultrasonic signal separation function 424 and correlator 426 to extract the received signal components at and near the frequency of the generated ultrasonic tone.

As shown in FIG. 4, output from ultrasonic signal separation function 424 may also be provided to equalizer 402 for use in adapting equalizer 402 to compensate for the frequency response characteristics of speaker 108 and microphone 109, as will be described below. Such adaptation may be performed as part of a configuration routine, and also updated after or during operation if desired.

Envelope calculation function 428 receives the correlation signal from correlator 426 (or the band-pass discrete-time filter, for the single ultrasonic tone case) and derives a time-domain envelope of that correlation signal to exclude the carrier frequencies and thus facilitate identification of the two-way transit time. This envelope signal generated by envelope calculation function 428 is applied to comparator 430 for comparison with a threshold level to detect a delay time at which the correlation between the received audio signal and the ultrasonic burst output by speaker 108. According to this implementation, the threshold level against which comparator 430 compares the correlation signal envelope is in the form of a time-varying threshold map, to exclude direct coupling of the burst from speaker 108 to microphone 109, as would be evident at short delay times. Comparator 430 in this example generates at its output a discrete-time signal representative of the results of comparisons of the envelope of the correlation signal with the threshold level or map over the relevant time period. This comparator result sample stream is applied to time-of-flight calculation function 432 in ultrasonic audio processing function 220 as shown in FIG. 4, which in turn calculates a time-of-flight, or two-way travel time, of the ultrasonic burst to and from the detected object. This calculated time-of-flight can then be communicated to digital processor system 102 or other appropriate processing logic for use in calculating distance of motion of the reflecting object or objects as useful in presence detection, motion detection, gesture detection, directivity control of audible audio output, or such other operational functions of audio/video system 100 as desired.

Figure 5:
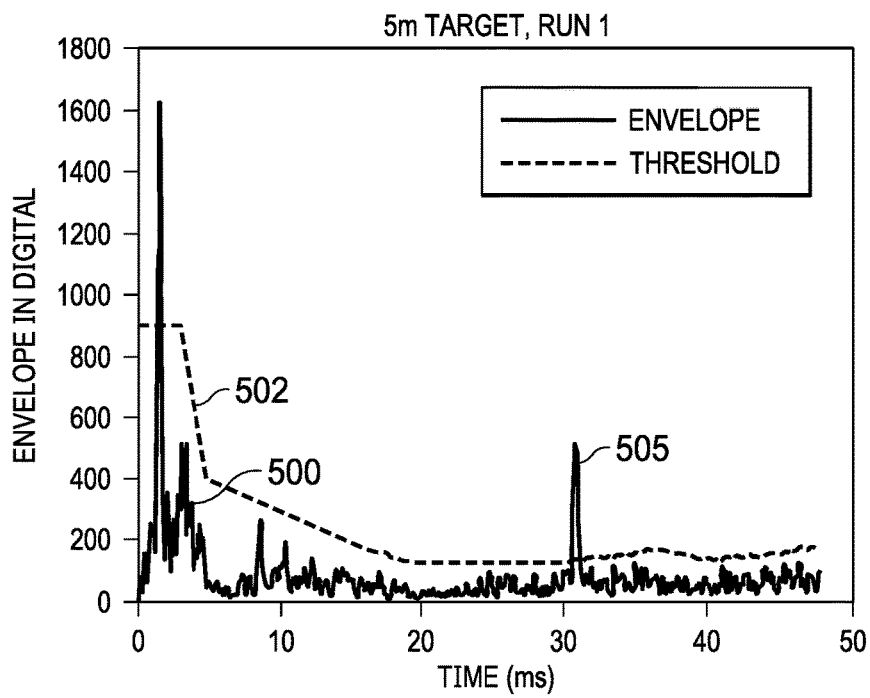
FIG. 5 is an example plot of time-domain correlation versus a threshold map in the operation of the ultrasonic processing function of the example embodiment of FIG. 4.

FIG. 5 illustrates an example of an envelope of a correlation signal produced by an example of correlator 426 and envelope calculation function 428 in performing ultrasonic presence detection according to this example implementation. The example of FIG. 5 results from the detection of an object at a distance of 5 m from speaker 108 (and microphone 109). Plot 500 in FIG. 5 represents an envelope of the correlation signal which, in this example, exhibits significant variation over time, including variations that do not represent receipt of an echo from a detected object. FIG. 5 also illustrates threshold map 502 against which comparator 430 compares envelope 500 for purpose of presence detection. This threshold map 502 is designed to vary over time to exclude peaks of envelope 500 unrelated to an echo. It is contemplated that threshold map 502 may be experimentally or otherwise empirically derived in advance and stored in memory of digital audio amplifier 200. In the example of FIG. 5, a distinct echo from an object is indicated by peak 505 in envelope 500 that extends above threshold map 502 at a time of about 31 msec. As such, comparator 430 would issue, in this example, a signal stream including indications corresponding to the samples at about 2 msec and about 31 msec, at which envelope 500 exceed threshold map 502. These indications are then used by time-of-flight calculation function 432 to derive the appropriate two-way travel time, from which the distance of the reflecting object can be derived. This travel time may then be used in the appropriate higher level presence detection function, such as may be implemented in digital processor system 102 for example.

As described above, the receive side of the example implementation of FIG. 4 is described as provided within audio processor 204 of digital audio amplifier 200. Alternatively, these receive side functions, including one or more of ultrasonic signal separation function 424, correlator 426, envelope calculation function 428, comparator 430, and time-of-flight calculation function 432 may be realized outside of audio processor 204, or outside of digital audio amplifier 200. For example, each of these functions may be implemented in digital processor system 102, in which case interface 420 would be provided for digital processor system 102 to receive signals from microphone 109, such that the determination of the two-way travel time is performed by digital processor system 102 directly. Alternatively, audio processor 204 may receive signals from microphone 109 as described above and perform some of the receive side functions, with the remainder of the functions performed within digital processor system 102.

Figure 6:
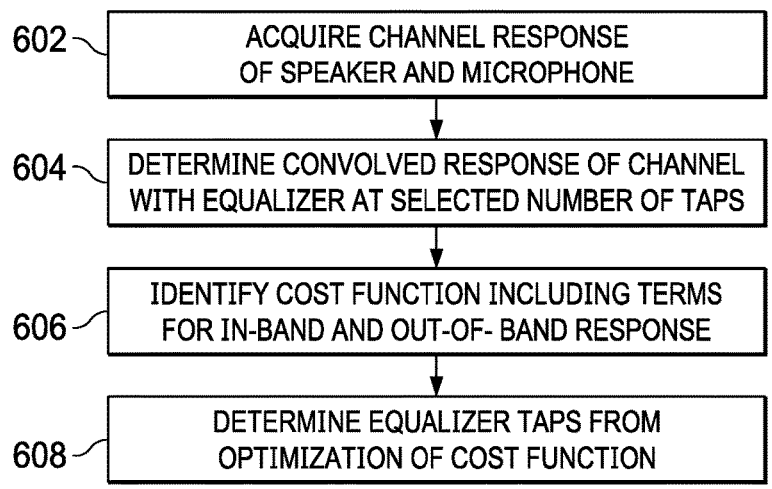
FIG. 6 is a flow diagram illustrating a process of defining coefficients for an equalizer for the ultrasonic processing function according to example embodiments.

Referring now to FIG. 6, a process of selecting the appropriate coefficients and other parameters to be applied by ultrasonic equalizer 402 in audio digital amplifier 200 for a particular combination of speaker 108 and microphone 109 according to an example implementation will be described. It is contemplated that this process may be performed by processing logic in audio digital amplifier 200, for example by digital signal processor circuitry in audio processor 204 or other computational logic executing program instructions stored in memory accessible to that processing logic, or alternatively by processing logic elsewhere in audio/video system 100, for example digital processor system 102.

In process 602, the channel response of speaker 108 and microphone 109 is acquired. It is contemplated that process 602 may be performed in any one of a number of ways. According to one example, burst generation function 400 may generate an output representative of periodically repeated random noise, with energy either limited to the ultrasonic band of interest or as wideband noise including the ultrasonic band of interest, for output via speaker 108. Ultrasonic frequency signals corresponding to that periodic random noise as output by speaker 108 and received by microphone 109 can then be analyzed, for example by digital signal processor circuitry in audio processor 204 applying a discrete Fourier transform calculation to derive a spectrum of the random noise as output by speaker 108 and received via microphone 109, including both magnitude and phase response. From this determination of the channel response in the frequency domain, a minimum-phase time domain response can be extracted in this process 602. Alternatively, the response characteristics of particular makes and models of speaker 108 and microphone 109 may be stored in memory of audio/video system 100 or is otherwise available (e.g., available online), in which case process 602 may be performed by retrieving those stored characteristics for either or both of speaker 108 and microphone 109. In either case, process 602 determines a time domain response of the combination of speaker 108 and microphone 109.

In process 604, a convolved response of the channel response determined in process 602 with equalizer 402 according to a selected design is derived. In this example implementation, the design of equalizer 402 applied in process 604 includes selection of its type, for example as an infinite impulse response (IIR) or a finite impulse response (FIR) digital equalizer, as well as its number of taps, or coefficients. Mathematically, for an FIR equalizer a(k) for taps k=0, 1, . . . , $K_a-1$, the convolved response of the channel and equalizer 402 can be expressed as:

$$c(k) = \sum_{l=0}^{K_a-1} h(k-l)a(l) \text{ for } k = 0, 1, \ldots, K_a + K - 2 \quad [1]$$

This convolved response will have a length $K_c=K_a+K-1$.

Using this expression for the convolution of the channel response determined in process 602 with equalizer 402 as designed, a cost function is identified in process 606. In process 608, optimization of this cost function is then performed to arrive at the coefficient values to be applied by equalizer 402 in ultrasonic audible audio processing function 210. According to an example implementation, a cost function J identified in process 606 involves two terms:

$$J = J_1 + wJ_2 \quad [2]$$

where $J_1$ expresses an in-band cost function based on the equalized performance in the ultrasonic band of interest, and $J_2$ expresses an out-of-band cost function based on equalization energy outside of the ultrasonic band of interest; weighting factor w is applied to provide the system designer with a tradeoff between in-band performance and out-of-band performance.

Figure 7:
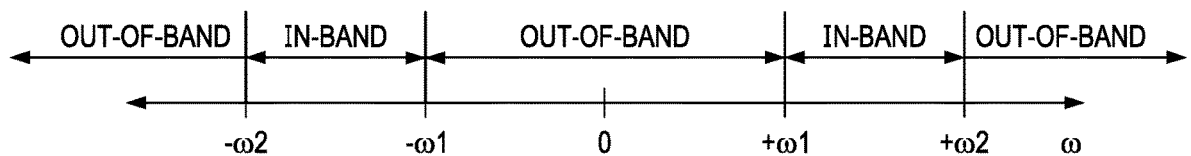
FIG. 7 is a frequency plot illustrating in-band and out-of-band frequencies as used in the process of FIG. 6 according to example embodiments.

In this example implementation, the in-band cost function can be expressed mathematically as:

$$J_1 = \int_{\omega_1}^{\omega_2} \left[ \sum_{k_1=0}^{K_c-1} c(k_1)e^{-j\omega k_1} - e^{-j\omega n_0} \right] \left[ \sum_{k_2=0}^{K_c-1} c(k_2)e^{-j\omega k_2} - e^{-j\omega n_0} \right]^* d\omega + \quad [3]$$

$$\int_{-\omega_2}^{-\omega_1} \left[ \sum_{k_1=0}^{K_c-1} c(k_1)e^{-j\omega k_1} - e^{-j\omega n_0} \right] \left[ \sum_{k_2=0}^{K_c-1} c(k_2)e^{-j\omega k_2} - e^{-j\omega n_0} \right]^* d\omega$$

wherein $k_1$ and $k_2$ represent discrete sample indices, and where the term $e^{-j\omega n_0}$ represents the ideal response of the equalized channel (e.g., a flat response). The frequencies $\pm\omega_1$ and $+\omega_2$ are the frequencies defining the in-band and out-of-band frequency ranges, as shown in FIG. 7. As shown in that FIG. 7, the frequency band of interest is between $\omega_1$ and $\omega_2$, which appears on both side of DC=0 in the complex plane. As such, cost function $J_1$ expresses the difference between the equalized channel c(k) and the ideal channel response in the band of interest. The out-of-band cost function $J_2$ in this example implementation can be expressed mathematically as:

$$J_2 = \int_{-\pi}^{-\omega_2} \left[\sum_{l=0}^{K_a} a(l)e^{-j\omega l}\right]\left[\sum_{k=0}^{K_a} a(k)e^{-j\omega k}\right]^* d\omega + \quad [4]$$

$$\int_{\omega_2}^{\pi} \left[\sum_{l=0}^{K_a} a(l)e^{-j\omega l}\right]\left[\sum_{k=0}^{K_a} a(k)e^{-j\omega k}\right]^* d\omega +$$

$$\int_{-\omega_1}^{\omega_1} \left[\sum_{l=0}^{K_a} a(l)e^{-j\omega l}\right]\left[\sum_{k=0}^{K_a} a(k)e^{-j\omega k}\right]^* d\omega$$

As evident from this equation [4], the cost function $J_2$ is intended to express the energy of equalizer 402 outside of the band of interest, namely at frequencies higher than $\omega_2$ and lower than $\omega_1$.

In process 608, as noted above, the total cost function J of equation [2] is then optimized. In this example implementation, this optimization process 408 is a minimization of the total cost function J, namely a minimization of a weighted sum of cost function $J_1$ expressing deviation of the equalized channel from the ideal response plus cost function $J_2$ expressing the out-of-band energy of equalizer 402, with the sum weighted by a parameter w that may be selected according to a design or system constraints, for example as determined by experimentation or characterization. Such a minimization of cost function J with equalizer coefficient vector â can be derived from taking the partial derivative of cost function J with respect to coefficient conjugates a*(k), and setting that derivative to zero:

$$\frac{\partial J}{\partial a^*(k)} = \frac{\partial J_1}{\partial a^*(k)} + w\frac{\partial J_2}{\partial a^*(k)} = 0, k = 0, 1, \ldots, K_a - 1 \quad [5]$$

A solution for an optimal a vector can be derived from:

$$(R_1 + wR_2)a = h_p \quad [6]$$

where $a = [a(0) \ldots a(K_a-1)]^T$, and the elements of matrices $R_1$, $R_2$, and h are defined as:

$$R_1(l, k) = \sum_{k_1=0}^{K_c-1}\sum_{k_2=0}^{K_c-1} h(k_1 - k) \quad [7]$$

$$h^*(k_2 - k)2\left\{\omega_2 \text{sinc}\left[\frac{\omega_2(k_1 - k_2)}{\pi}\right] - \omega_1 \text{sinc}\left[\frac{\omega_1(k_1 - k_2)}{\pi}\right]\right\}$$

$$R_2(l, k) = 2\pi\text{sinc}(l - k) - 2\omega_2\text{sinc}\left[\frac{\omega_2(l-k)}{\pi}\right] + 2\omega_1\text{sinc}\left[\frac{\omega_1(l-k)}{\pi}\right] \quad [8]$$

$$h_p(k) = \sum_{k_2=0}^{K_c-1} h^*(k_2 - k)2\left\{\omega_2\text{sinc}\left[\frac{\omega_2(n_0 - k_2)}{\pi}\right] - \omega_1\text{sinc}\left[\frac{\omega_1(n_0 - k_2)}{\pi}\right]\right\} \quad [9]$$

Because $R_1$ and $R_2$ are Toeplitz matrices, only the first row and first column of those matrices need be calculated. Following this calculation, the optimal equalizer coefficient vector â that minimizes cost function J is given by:

$$\hat{a} = (R_1 + wR_2)^{-1} h_p \quad [10]$$

The tap weights, or coefficients, of equalizer 402 can then be set according to this vector optimal equalizer coefficient vector â as determined from the minimization of cost function J in process 608.

Figure 8:
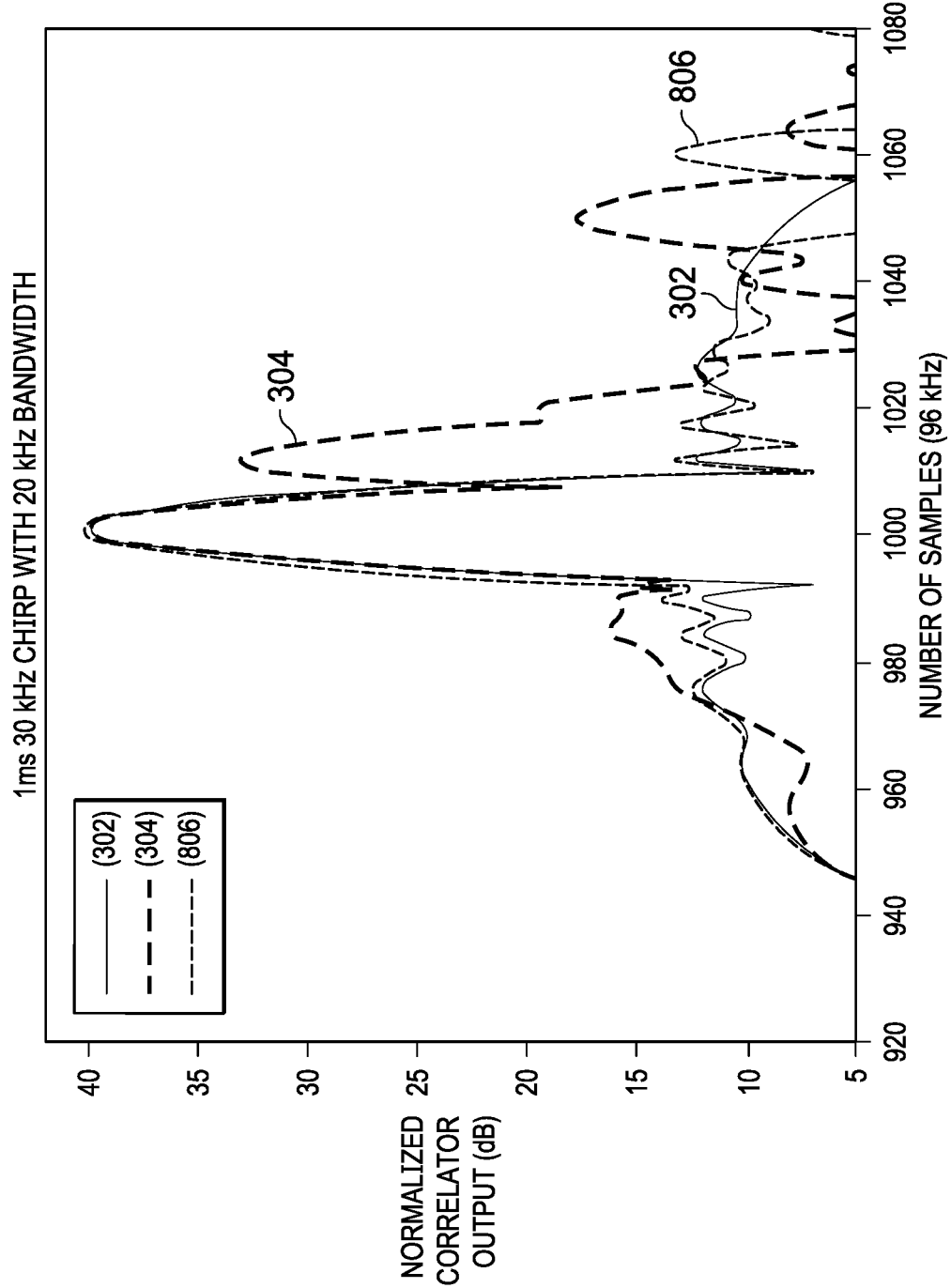
FIG. 8 illustrates a plot of time-domain correlation of an ultrasonic chirp according to an example embodiment relative to the plots of time-domain correlation for shown in FIG. 3C for the unequalized channel and an ideal channel.

FIG. 8 illustrates the performance of an example of equalizer 402 according to an example implementation of the architecture of FIG. 4, in the form of the normalized output of time-domain correlation (in dB) over time of a 1 msec ultrasonic "chirp" of 20 kHz bandwidth centered at 30 kHz (i.e., the chirp varies in frequency from 20 kHz to 40 kHz), as expressed in numbers of samples at a 96 kHz sampling rate. Plots 302 and 304 are the same correlation plots as shown in FIG. 3C, with plot 302 illustrating the correlation for a theoretical speaker and microphone that both have ideal frequency response characteristics (i.e., flat over 20 kHz to 40 kHz). Plot 304 illustrates the correlation for the same chirp by speaker 108 and microphone 108 with the frequency responses shown in FIG. 3A and FIG. 3B, respectively, with no equalization performed on the ultrasonic signal. In contrast, plot 806 of FIG. 8 illustrates the correlation performance of the same speaker and microphone 108 with an equalizer 402 pre-compensating the ultrasonic chirp in an architecture as shown in FIG. 4, where the equalizer 402 is realized as a 51-tap ($K_a = 51$) FIR equalizer with coefficients as defined by equations [1] through [10] and implemented by the process of FIG. 6. As evident from FIG. 8, the side lobe echoes of plot 806 are substantially attenuated from those of the no-equalizer plot 304, and for the echoes close to the peak lobe, approach the performance of the ideal channel response of plot 302. As such, the width in time of the main echo of the ultrasonic chirp from a detected object is much reduced, facilitating the ability of the ultrasonic presence detection to separate multiple objects from one another and thus increase spatial resolution. While equalized plot 806 indicates some later sidelobes that have a higher amplitude (e.g., the sidelobe at about 1060 samples), it is contemplated that these later echoes can be readily filtered out or otherwise ignored in the presence determination process.

Figure 9:
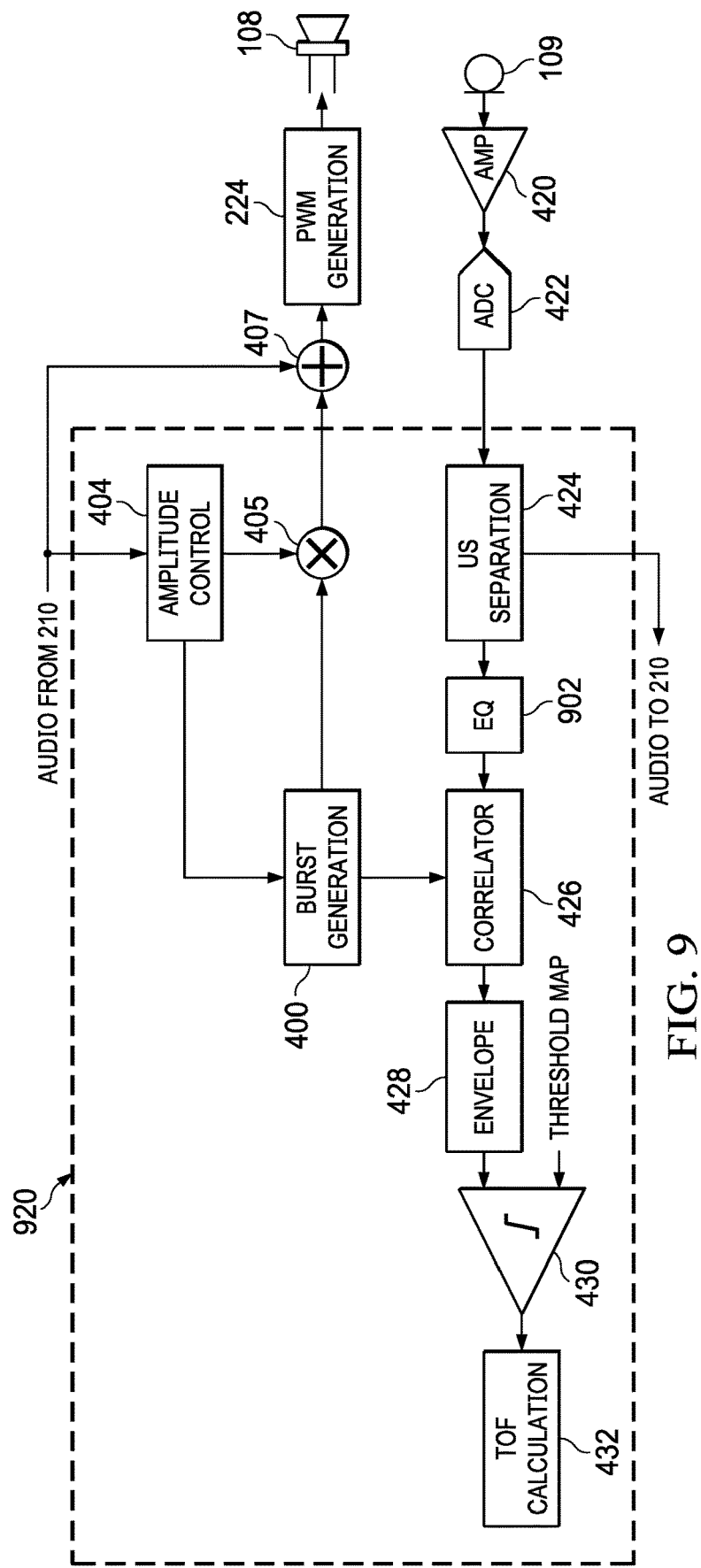
FIG. 9 is an electrical diagram, in block and schematic form, of an ultrasonic processing function in a digital audio amplifier according to another example embodiment.

According to another implementation, equalization to compensate for channel response non-idealities may be applied to ultrasonic signals as received from microphone 109, rather than prior to output by speaker 108. FIG. 9 illustrates the construction and functional arrangement of ultrasonic processing function 920 as may be implemented in digital audio amplifier 200 in audio system 106 according to an example of this other implementation. Those components of ultrasonic processing function 920 and digital audio amplifier 200 in FIG. 9 that are the same as in the architecture of FIG. 4 are indicated by the same reference numerals.

In the arrangement of FIG. 9, the ultrasonic burst generated by burst generation function 400 is applied without equalization to gain stage 405. Optional amplitude control function 404 is coupled to gain stage 405 and also to burst generation function 400 itself, as described above, to reduce the gain of the ultrasonic signal from burst generation function 400 or to block generation of the ultrasonic signal altogether, for example to reduce clipping at the output if the amplitude of the audible audio signal is high. The ultrasonic and audible audio signals are summed at signal adder 407 and converted by PWM generation circuitry 224 to a PWM signal for driving speaker 108.

On the receive side of ultrasonic processing function 920 shown in FIG. 9, as in the implementation of FIG. 4, signals received from microphone 109 are amplified by LNA 420, converted from analog to digital by ADC 422, and applied to upstream separation function 424 for separation of the ultrasonic portion of the received signal from the audible frequency portion of that signal, for example by way of a digital filter function executed by digital signal processor 220.

In the example implementation of FIG. 9, ultrasonic processing function 920 includes equalizer 902 to compensate the ultrasonic signal as received according to the frequency response characteristics of both speaker 108 and microphone 109 over the ultrasonic frequencies of interest. Since the received signals have been converted to the digital domain by ADC 422, equalizer 902 may be realized by way of a discrete-time equalizer, such as a continuous-time discrete-time linear equalizer, for example as executed by digital signal processor circuitry in audio processor 204. As in the case of the transmit side equalizer 402, equalizer 902 on the receive side of ultrasonic audio processing function 220 is operating only on signal frequencies within a relatively narrow band of interest, and such that it can be efficiently realized as compared with equalizers covering a full frequency range including both audible and ultrasonic frequencies. Equalizer 902 may also be arranged according to the same or similar process of selecting the appropriate coefficients and other parameters for a particular combination of speaker 108 and microphone 109 as described above relative to FIG. 6. For example, it is contemplated that the determination of the digital filter coefficients for the equalizer as described above relative to equations [1] through [10] similarly applies to the definition of coefficients for equalizer 902.

In this example implementation of FIG. 9, the equalized signal, for example in the form of an equalized discrete-time sample stream, is forwarded by equalizer 902 to correlator 426, which correlates this equalized signal with a copy or template of the ultrasonic burst generated by burst generation function 400 to determine the time relationship between the generation of the ultrasonic burst by burst generation function 400 and the receipt of the separated equalized received signal and thus determine a delay time between the two signals, for example by performing a time domain correlation. Envelope calculation function 428 receives the correlation signal from correlator 426, derives a time-domain envelope of that correlation signal to exclude the carrier frequencies, and applies the correlation envelope signal to comparator 430 for comparison with a threshold level or threshold map, as described above, to detect a delay time at the peak correlation. A discrete-time signal representative of the results of comparisons of the envelope of the correlation signal with the threshold level or map over the relevant time period produced by comparator 430 is applied to time-of-flight calculation function 432, which in turn calculates a time-of-flight, or two-way travel time, of the ultrasonic burst to and from the detected object. As in the implementation of FIG. 4, this calculated time-of-flight can then be communicated to digital processor system 102 or other appropriate processing logic for use in calculating distance of motion of the reflecting object or objects as useful in presence detection, motion detection, gesture detection, directivity control of audible audio output, or such other operational functions of audio/video system 100 as desired.

Whether realized at the generation of the ultrasonic presence detection signal, or applied to the received ultrasonic echo, the equalization of the ultrasonic signal according to these examples accurately reduces the width of received echoes upon correlation with the ultrasonic burst, thus improving the spatial resolution of presence detection. Furthermore, the band-limited equalization performed according to these examples can be optimized for the ultrasonic frequencies of interest without consideration of frequencies outside of the detection signal such as audible frequencies, enabling efficient implementation of the equalizer from the standpoints of hardware and computational complexity.

Figure 10:
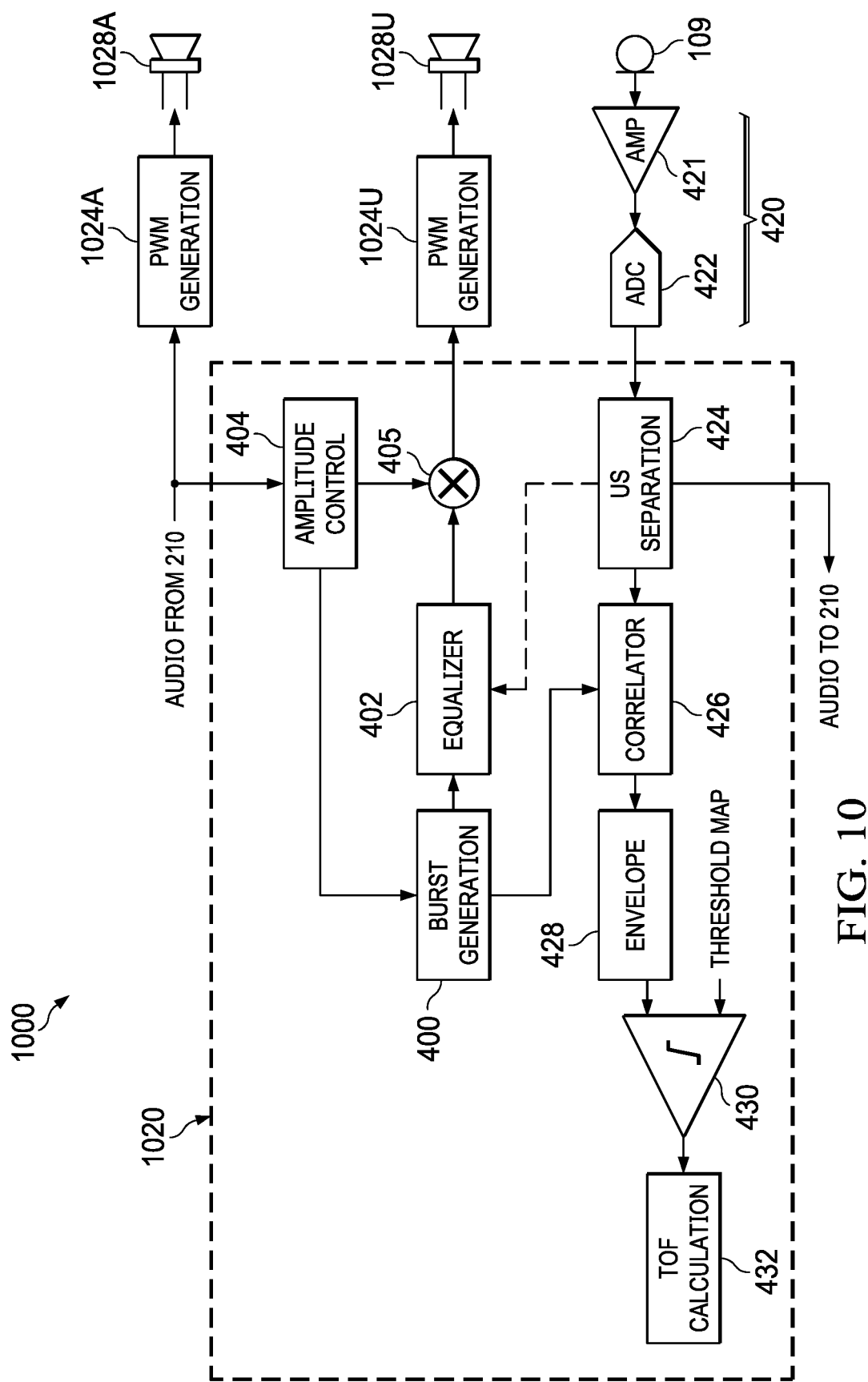
FIG. 10 is an electrical diagram, in block and schematic form, of an ultrasonic processing function in a digital audio amplifier according to another example embodiment.

According to another implementation, one or more speakers are provided for ultrasonic audio signals, separate from the speakers for the audible audio signals. FIG. 10 illustrates the construction and functional arrangement of ultrasonic processing function 1020 as may be implemented in digital audio amplifier 1000 in audio system 106 according to an example of this other implementation. Those components of ultrasonic processing function 1020 and digital audio amplifier 1000 in FIG. 10 that are the same as in the architecture of FIG. 4 are indicated by the same reference numerals.

In the arrangement of FIG. 10, the ultrasonic burst generated by burst generation function 400 is equalized by equalizer 402 and applied to gain stage 405, with optional amplitude control function 404 (if present) coupled to gain stage 405 and burst generation function 400, as described above, to reduce the gain of or block the ultrasonic signal from burst generation function 400 in response to the amplitude of the audible audio signal being high. Alternatively, amplitude control function 404 may receive another control signal, for example from digital processor system 102, for adjusting the amplitude of the ultrasonic burst as described above in connection with FIG. 4. In any case, according to this implementation, the audible audio signals from audio processing function 210 are applied directly to PWM generation circuitry 1024A, and the ultrasonic audio signals from gain stage 405 are applied directly to separate PWM generation circuitry 1024U, with no combining of the audible and ultrasonic audio signals as in the implementations described above relative to FIG. 4 and FIG. 9. Ultrasonic PWM generation circuitry 1024U drives speaker 1028U, while audible PWM generation circuitry 1024A drives separate speaker 1028A.

The receive side of ultrasonic processing function 1020 shown in FIG. 10 in this implementation may be constructed and operate the same as described above for the implementation of FIG. 4.

Alternatively, the implementation described above relative to FIG. 10, with separate speakers 1028A, 1028U for the audible and ultrasonic audio signals, respectively, may be applied to the architecture described above relative to FIG. 9 in which equalization of ultrasonic signals is performed on the receive side, for example after separation of the ultrasonic and audible audio signals.

In any case, the use of separate speakers for the ultrasonic and audible audio output may provide additional flexibility and accuracy in ultrasonic presence detection. For example, according to this implementation the placement of separate ultrasonic speakers 1028U is not constrained to the placement of speakers 1028A for the audible audio. This allows the placement of audible speakers 1028A to be defined for a pleasing audio experience, while ultrasonic speakers 1028U can be separately placed to obtain the desired effectiveness and accuracy of presence detection, especially considering that the physical size of speakers 1028U for ultrasonic output can be significantly smaller than that of audible speakers 1028A outputting the lower frequency audible audio output.

The term "couple", as used herein, may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection" and "pin" are used interchangeably. Unless specifically stated to the contrary, these terms are generally used to mean an interconnection between or a terminus of a device element, a circuit element, an integrated circuit, a device, or other electronics or semiconductor component.

Unless otherwise stated, "about," "approximately," or "substantially" preceding a value means +/−10 percent of the stated value. Modifications are possible in the described examples, and other examples are possible within the scope of the claims.

What is claimed is:

1. An apparatus, comprising:
    an ultrasonic signal generation circuit having a first output and a control output;
    an audible signal generation circuit having a second output;
    an audio driver circuit having first and second inputs and a driver output, the first input coupled to the first output, and the second input coupled to the second output; and
    a processing circuit having an audio input, a control input, and a time difference output, the control input coupled to the control output.

2. The apparatus of claim 1, wherein the audio driver circuit is configured to generate an audio driver signal at the driver output based on overlaying a first ultrasonic signal at the first input with an audible signal at the second input.

3. The apparatus of claim 2, wherein the ultrasonic signal generation circuit has an amplitude control input, and the ultrasonic signal generation circuit is configured to set an amplitude of the first ultrasonic signal responsive to an amplitude control signal at the amplitude control input.

4. The apparatus of claim 2, wherein at least one of the ultrasonic signal generation circuit or the audio driver circuit is configured to set an amplitude of the first ultrasonic signal in the audio driver signal based on an amplitude of the audible signal.

5. The apparatus of claim 2, wherein the processing circuit is configured to:
    extract a second ultrasonic signal from an audio signal at the audio input responsive to a control signal at the control input; and
    provide a time difference between a time of transmission of the first ultrasonic signal and a time of reception of the second ultrasonic signal at the time difference output.

6. The apparatus of claim 5, wherein the control signal represents a template of the first ultrasonic signal; and
    wherein the processing circuit is configured to perform a correlation operation between the template and the second ultrasonic signal, and provide, at the time difference output and based on a result of the correlation operation, a signal representing a time difference between a time of transmission of the first ultrasonic signal and a time of reception of the second ultrasonic signal.

7. The apparatus of claim 6, wherein the control signal indicates the time of transmission of the first ultrasonic signal.

8. The apparatus of claim 6, wherein the processing circuit is configured to:
    identify a peak based on comparing the result of the correlation operation with a threshold map; and
    determine the time difference based on the identified peak.

9. The apparatus of claim 5, wherein the processing circuit is configured to extract the second ultrasonic signal by performing a high-pass filtering operation on the audio signal.

10. The apparatus of claim 5, wherein the audible signal is a first audible signal, the processing circuit has a processing output, and the processing circuit is configured to extract a second audible signal from the audio signal, and provide the second audible signal at the processing output.

11. The apparatus of claim 5, wherein the processing circuit is a first processing circuit, the control input is a first control input, the control signal is a first control signal, and the apparatus further comprises a second processing circuit having a second control input, a processing input, and a processing output, the processing input coupled to the first output, the processing output coupled to the first input, and the second processing circuit configured to:
    receive a second control signal at the second control input representing at least one of a first frequency response of a speaker or a second frequency response of a microphone;
    receive a third ultrasonic signal from the ultrasonic signal generation circuit;
    process the third ultrasonic signal responsive to the second control signal to generate the first ultrasonic signal; and
    provide the first ultrasonic signal at the processing output.

12. The apparatus of claim 11, wherein the audio driver circuit is configured to provide the audio driver signal to the speaker, and wherein the processing circuit is configured to receive the audio signal from the microphone.

13. The apparatus of claim 11, wherein the second processing circuit is configured to perform an equalization operation on the third ultrasonic signal to generate the first ultrasonic signal, in which the equalization operation compensates for the at least one of the first or second frequency responses.

14. The apparatus of claim 11, wherein the control output is a first control output, the second processing circuit has a third control input, the first processing circuit has a second control output coupled to the third control input, and the first processing circuit is configured to provide a third control signal at the second control output responsive a result of extraction of the second ultrasonic signal from the audio signal.

15. The apparatus of claim 14, wherein the second processing circuit is configured to adjust the at least one of the first or second frequency responses responsive to the third control signal.

16. The apparatus of claim 5, wherein the audio driver circuit is configured to provide the audio driver signal to a speaker having a first frequency response, and wherein the processing circuit is configured to receive the audio signal from a microphone having a second frequency response, and the processing circuit is configured to perform an equalization operation on the audio signal to compensate for the at least one of the first or second frequency responses and extract the second ultrasonic signal from the compensated audio signal.

17. A method comprising:
generating a first ultrasonic signal based on a template;
generating an audible signal;
generating an audio driver signal based on combining the first ultrasonic signal and the audible signal;
driving a speaker with the audio driver signal;
receiving an audio signal from a microphone;
extracting a second ultrasonic signal from the audio signal based on the template; and
determining a time difference between a time of transmission of the first ultrasonic signal and a time of reception of the second ultrasonic signal.

18. The method of claim 17, further comprising setting an amplitude of the first ultrasonic signal in the audio driver signal based on an amplitude of the audible signal.

19. The method of claim 17, wherein the audible signal is a first audible signal, and the method further comprises extracting a second audible signal from the audio signal.

20. The method of claim 17, further comprising performing an equalization operation on the first ultrasonic signal to generate a third ultrasonic signal, the equalization operation being based on at least one of a first frequency response of the speaker or a second frequency response of the microphone,
wherein generating an audio driver signal based on combining the first ultrasonic signal and the audible signal includes generating the audio driver signal based on combining the third ultrasonic signal and the audible signal.

21. The method of claim 20, further comprising adjusting the equalization operation based on a result of extracting the second ultrasonic signal from the audio signal.

22. The method of claim 17, further comprising performing an equalization operation on the audio signal to compensate for at least one of a first frequency response of the speaker or a second frequency response of the microphone,
wherein extracting a second ultrasonic signal from the audio signal includes extracting the second ultrasonic signal from the compensated audio signal.

* * * * *